UNITED STATES PATENT OFFICE.

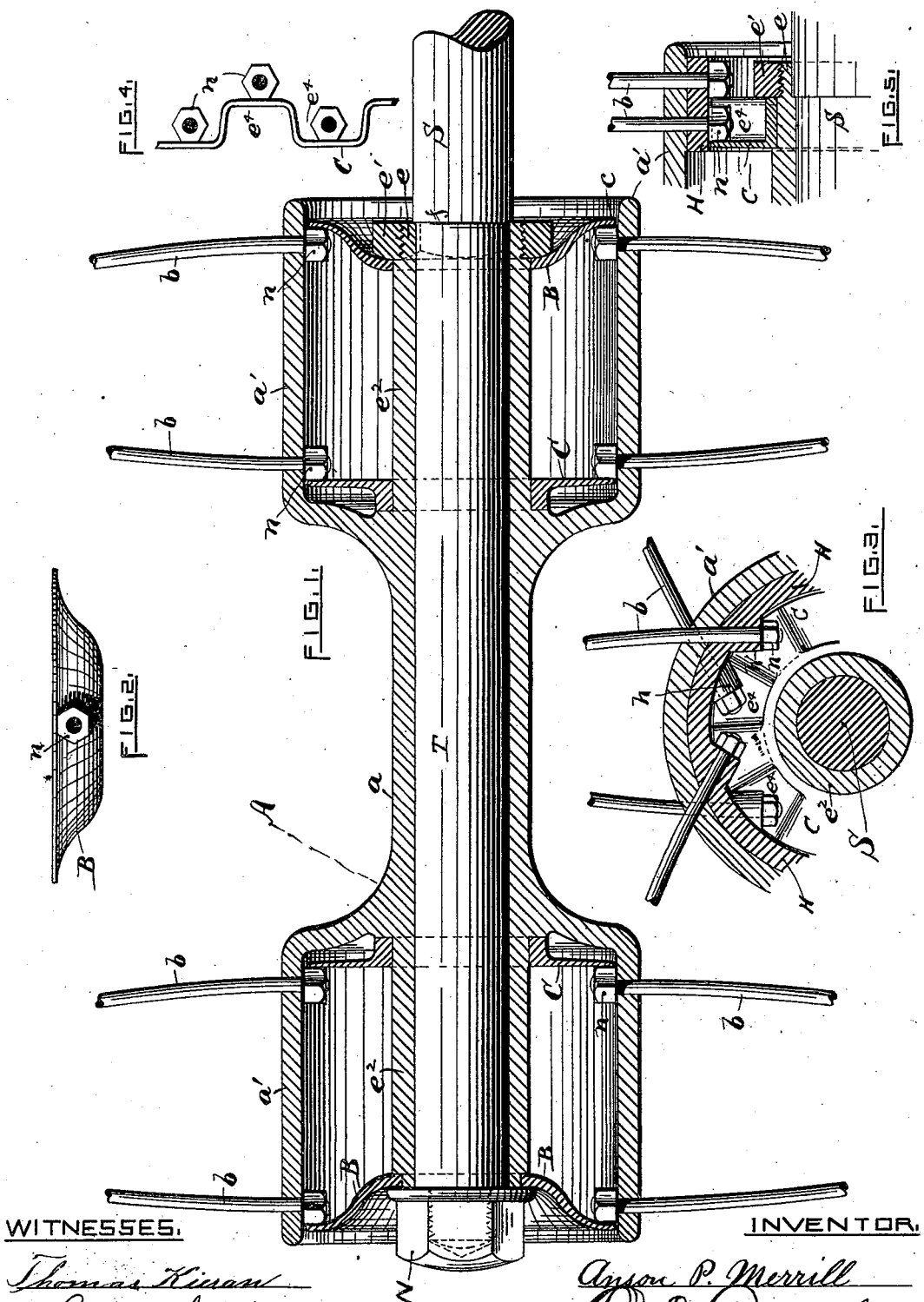

ANSON P. MERRILL, OF FALL RIVER, MASSACHUSETTS.

WHEEL FOR VELOCIPEDES.

SPECIFICATION forming part of Letters Patent No. 355,700, dated January 11, 1887.

Application filed April 14, 1886. Serial No. 198,818. (No model.)

*To all whom it may concern:*

Be it known that I, ANSON P. MERRILL, of Fall River, in the county of Bristol and State of Massachusetts, have invented certain new and useful Improvements in Tricycles; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to certain new improvements in bicycle and tricycle wheels; and it consists in certain novel construction and combination of the hub and parts of a wheel for bicycles, tricycles, and other vehicles, the object of my invention being to produce a cheap and durable wheel of that degree of stiffness that will prevent, to a great extent, side vibration. I attain these objects by means of the peculiar construction and arrangement of the parts, which will be more fully set forth in the specification, and pointed out in the claims.

Referring more particularly to the drawings hereto annexed, Figure 1 is a longitudinal sectional view of my improved wheel. Fig. 2 is a detail view of the hub-plate. Fig. 3 is a sectional end view. Fig. 4 is a detail view, and Fig. 5 is a detail view in section.

Similar letters refer to like parts throughout all the figures.

A represents the body of the hub, formed of metal or other suitable material, and provided with a central bore for the reception of an axle. The ends of hub A are enlarged and provided with an inner annular chamber, $a'$, adapted to receive the ends of bolts, spokes, washers, and rings.

B represents a front dish-shaped washer or locking-plate, having a central bore to receive axle S, and formed to fit inside the chambers $a'$ at the front and rear, and by means of nut N at the outer end and by nut $e'$ on the inner end is held in place. The inner annular spring locking-plates, C, are also formed with central bore to fit over the bearing-cylinders $e''$, and are pushed to their shoulder at the rear of said cylinders or sleeves $e''$, as shown in Fig. 1.

Chambers $a'$ are perforated at suitable points to receive screw-threaded spokes $b$, which are provided with screw-threaded nuts $n$, said perforations being straight or inclined, as desired, to adjust the spokes $b$, said spokes being bent or inclined to a central rim.

For the purpose of giving spokes $b$ any desired angle or inclination and securing the same firmly in place, I form a tangential ring, H, constructed with angular or in part circumferential projections $h$, said projections and tangential ring being perforated at an angle or on an incline with the periphery of said rings to register with perforations formed at an angle or like inclination in chambers $a'$, as shown in Fig. 3.

C represents an inside locking spring plate, constructed circular in form, of spring metal or other suitable material, and provided with a central bore adapted to fit loosely over the bearings $e''$, said plate having curved or corrugated sides $e''''$, as shown in Figs. 3, 4, and 5, the object of said formation being to stiffen the hub and bear against the nuts $n$, to hold the same in place.

Chambers $a'$ may be formed more or less elongated, as desired, and the bearing-arms $e''$ cast or constructed integral with said chambers or hub, and the part of hub A between chambers $a'$ may be formed round, angular, or any desired shape, and of more or less diameter, as preferred, properly angular in form.

An axle, S, is constructed with a bearing-arm, T, having a shoulder, $f$, against which the end of one of the bearings $e''$ abuts, as shown in Fig. 1, said end being outwardly screw-threaded to receive an inwardly screw-threaded binding-nut, $e'$, the inner face of which is curved to fit the dished-shaped surface of plate B, against which it is pressed.

Having thus described my invention, what I claim, and desire to secure by Letters Patent, is—

1. A vehicle-hub having enlarged chambered ends with integral central bearings and tangential rings formed to fit within said ends, and provided with angular projections and perforations at an angle to its circumference, and adapted to register with inclined perforations in the hub ends for the purpose of giving the spokes any desired angle, substantially as set forth.

2. A vehicle-hub provided with enlarged perforated ends, angular tangential rings and a circular corrugated or curved face backing-plate, and suitable end collars and washers, substantially as and for the purpose set forth.

3. An inside spring locking-plate for vehicle-hubs, consisting of a circular corrugated plate provided with a central bore, substantially as and for the purpose set forth.

4. The combination, in a vehicle-hub, of the hollow ends, the outer shell adapted to receive the spokes and provided with central bearings integral therewith, with the inner ring having angular projections and locking devices, substantially as described.

5. A vehicle-hub having an elongated neck or central connection and duplex hollow enlarged ends, the latter provided with inner bearings integral therewith, in combination with the inner ring-washer, and the outer ring with locking devices, as described.

In testimony that I claim the foregoing as my own I hereto affix my signature in presence of two witnesses.

ANSON P. MERRILL.

Witnesses:
SAMUEL HADFIELD,
JEREMIAH G. RILEY.